(12) United States Patent
McWayne et al.

(10) Patent No.: US 10,807,881 B2
(45) Date of Patent: Oct. 20, 2020

(54) WATER TREATMENT APPARATUS

(71) Applicant: Erick McWayne, Kent, WA (US)

(72) Inventors: Erick McWayne, Kent, WA (US); Howard Sprouse, Bellevue, WA (US)

(*) Notice: Subject to any disclaimer, the term of this patent is extended or adjusted under 35 U.S.C. 154(b) by 0 days.

(21) Appl. No.: 16/188,110

(22) Filed: Nov. 12, 2018

(65) Prior Publication Data
US 2019/0352192 A1    Nov. 21, 2019

Related U.S. Application Data

(63) Continuation-in-part of application No. 14/275,430, filed on May 14, 2014, now Pat. No. 10,125,034.

(51) Int. Cl.
C02F 1/00    (2006.01)

(52) U.S. Cl.
CPC .......... C02F 1/004 (2013.01); C02F 2307/14 (2013.01)

(58) Field of Classification Search
None
See application file for complete search history.

(56) References Cited

U.S. PATENT DOCUMENTS 3,854,291 A * 12/1974 Perkins .................. E02B 8/023
                                                405/108
2002/0060500 A1* 5/2002 Lafferty ................... F03D 9/12
                                                310/11

* cited by examiner

Primary Examiner — Richard C Gurtowski
(74) Attorney, Agent, or Firm — Dean Craine

(57) ABSTRACT

A water treatment apparatus that includes a weir with an upstream wall, a downstream wall, side walls, a base and a top opening. Located inside the weir is a chamber. Formed on the upstream wall is an influent port hole that allows water flowing against the upstream wall to flow into the chamber. Formed on the downstream wall is an effluent port hole that allows water to exit the chamber. Located inside the chamber is water treatment equipment. When the weir is placed in a waterway with the upstream wall facing upstream and the influent port hole is at least partially submerged, water flows into the influent port hole and into the chamber and undergoes treatment by the water treatment equipment. The water then flows against the inside surface of the downstream wall and exits the weir through the effluent port hole and returns to the waterway downstream.

8 Claims, 13 Drawing Sheets

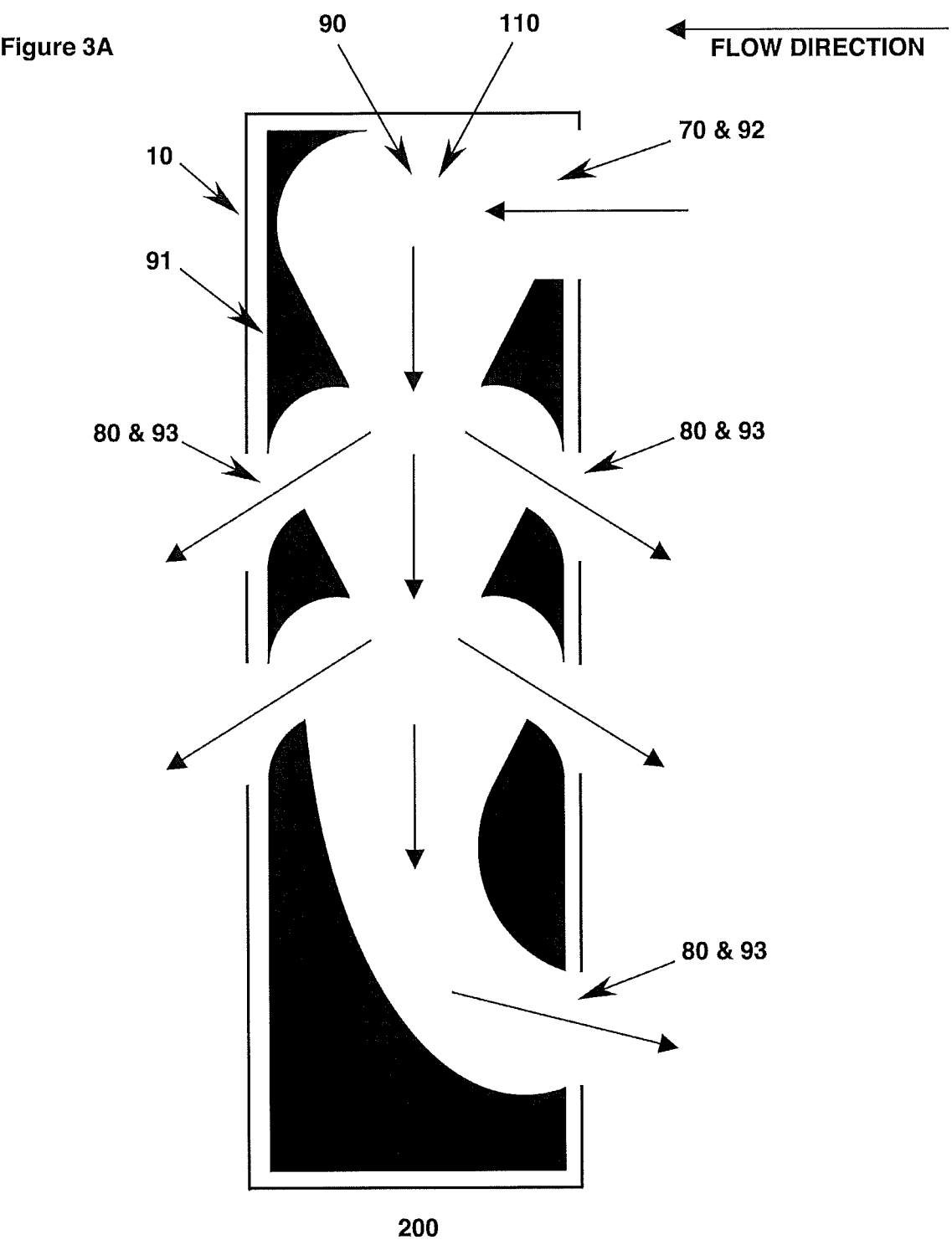

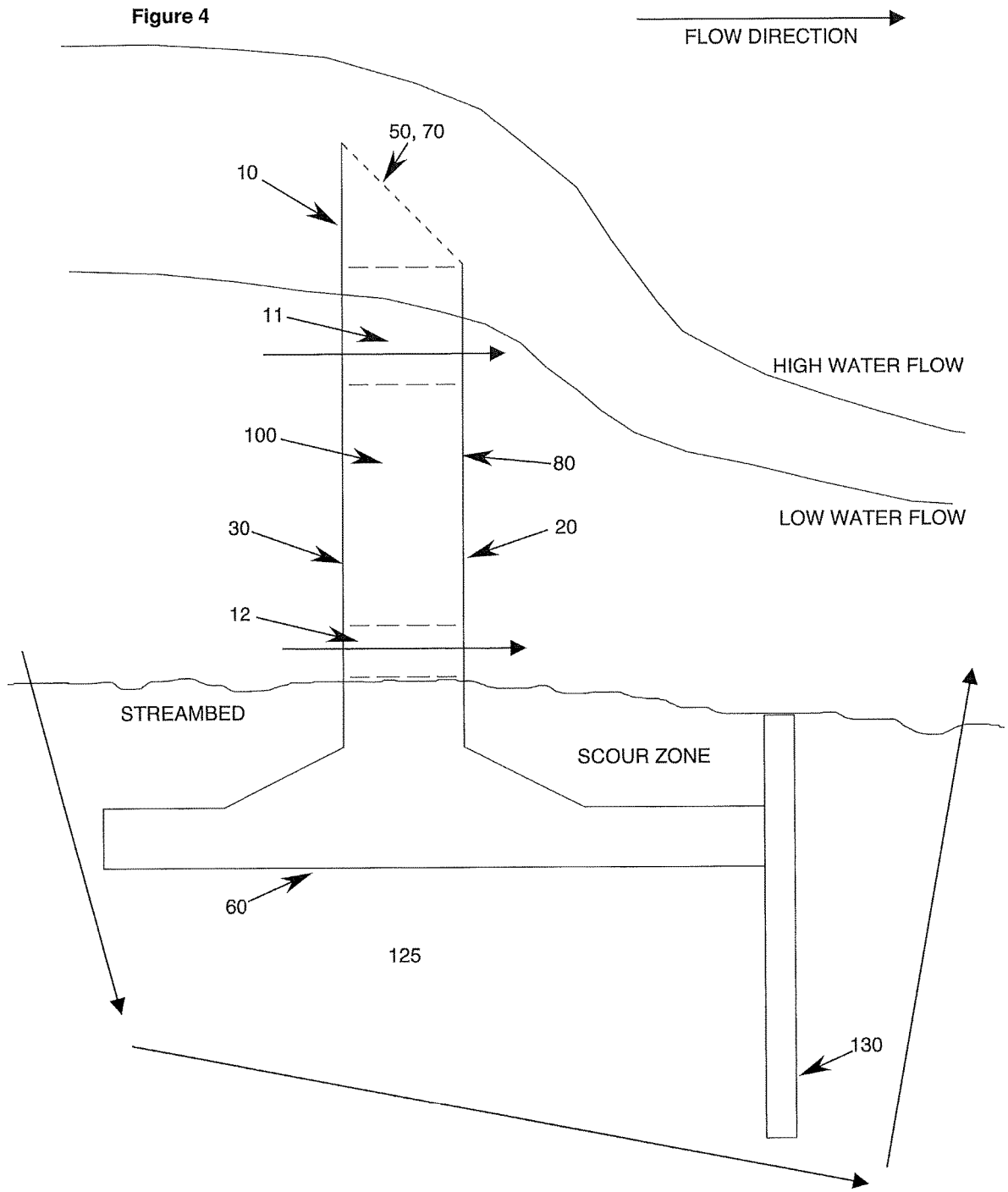

WATER TREATMENT APPARATUS

This is a continuation in part application based on U.S. utility patent application (application Ser. No. 14/275,430) filed on May 14, 2014.

BACKGROUND OF INVENTION

Contaminants in streams, rivers, and other waterways adversely affect water quality and the ecological balance of the environment. A water treatment device, which can be placed in waterways, can positively affect water quality. Weirs are barriers, usually smaller than dams, placed across waterways to change the characteristics of water flow. A weir can be used as a water treatment device to improve water quality.

BRIEF DESCRIPTION OF INVENTION

A water treatment apparatus comprising a weir with at least one outer wall, which defines a chamber that holds reactive filter media ("filter media"). The filter media removes contaminants from fluid and may be renewed or changed to increase the functional lifespan of the weir. The filter media is chosen to address site-specific concerns; e.g., metals, oil and grease, polycyclic aromatic hydrocarbons, pesticides, and nutrients, amongst others. Flow through the weir may be controlled through ports on the influent and effluent sides, baffles, and/or valvular conduits, or other similar mechanisms. The weir may be used in a plurality of configurations. For example, at least two weirs may be used in series or parallel; engineered streambeds (i.e., engineered hyporheic zones) may be installed below at least one weir; or a combination thereof. The weir can improve aquatic habitats by removing pollutants from water and can improve aquatic habitats by creating upstream pools that allow suspended solids to settle, and downstream cascades that increase dissolved oxygen. Engineered hyporheic zones can also improve aquatic habitats by removing pollutants from water and lowering water temperatures.

In an alternative embodiment, other water treatment equipment may be placed within the weir. The water treatment equipment improves water quality and aquatic habitats by removing contaminants from fluid or by releasing water quality enhancing additives such as calcium, magnesium, and oxygen, amongst others. The water treatment equipment may be renewed or changed to increase the functional lifespan of the weir. The water treatment equipment is chosen to address site-specific concerns such as agricultural runoff, stormwater runoff, industrial wastewater, water treatment plant effluent, or naturally occurring toxicants (e.g., aluminum, arsenic, chloride, iron, manganese, mercury, and selenium), amongst others. Contaminants of concern within these waters may include agrochemicals, biological and chemical oxygen demand, halogenated organics, metals, nitrate, oil and grease, PFOA and PFOS, pathogens, personal care products, pharmaceuticals, phosphate, polycyclic aromatic hydrocarbons, salts, suspended solids, thermal pollution (e.g., excess temperature), and other toxic organics, amongst others. The water treatment equipment may be passive, or connected to an electrical, mechanical, or thermal energy source. Water treatment equipment may be placed in removable cartridges. Water treatment equipment may be serviced in place within the weir or after removing the equipment from the weir.

Examples of water treatment equipment that may be placed inside the weir include: air compressors, air bubblers, air pump, air spargers, air strippers, augers, rotating biocontactors, bubble diffusers, centrifuges, electro-coagulators, capacitive and electro deionizers, electrodes, electrodialysis units, evaporators, solvent extractors, belt filters, biofilters, media filters, pressure filters, rotating disk filters, vacuum membrane filters, dissolved air flotation cells, heat exchangers, conductive heaters, electrical resistive heaters, radio frequency heaters, solar thermal heaters, thermoelectric heaters, sludge hoppers, hydrolyzers, chemical injectors, screw jacks, electro magnets, membranes, microwaves, catalytic oxidizers, chemical oxidizers, electrolytic oxidizers, supercritical water oxidizers, wet oxidizers, regenerative thermal oxidizers, oxygen generators, ozone generators, water pumps, bioreactors, biofilm reactors, electric reactors, membrane reactors, microbe-electrode reactors, refrigerators, algae scrubbers, electro-kinetic separators, gravity separators, parallel an non-parallel plate separators, steam generators, natural endogenous respiration vessels, superoxide generators, ultraviolet (UV) light tubes, UV disinfectors, and UV oxidizers, amongst others. The number and type of water treatment equipment placed within a specific weir will depend on the pollutants to be removed and local environmental conditions.

BRIEF DESCRIPTION OF THE SEVERAL VIEWS OF THE DRAWINGS

Other features and advantages of the present invention will become apparent in the following detailed descriptions of the preferred embodiment with reference to the accompanying drawings, of which:

FIG. 3A is a schematic showing fluid flowing through an exemplary weir comprising a valvular conduit;
FIG. 4 is a side view of an exemplary weir.

DETAILED DESCRIPTION OF THE INVENTION

The present invention is a water treatment apparatus (8) comprising a weir (10) used to remove pollutants from fluid. Multiple embodiments of the invention are described hereinafter with reference to the accompanying drawings. This invention may, however, be embodied in many different forms and should not be construed as limited to the embodiments set forth herein; rather, these embodiments are provided so this disclosure will be thorough and complete and will fully convey the scope of the invention to those skilled in the art. For exemplary purposes, the weir is described as it would be used in a waterway. However, a person having ordinary skill in the art will understand that the weir may be used to treat any kind of fluid. Accordingly, fluid and water are used interchangeably throughout these specifications. Further, flow paths shown in accompanying drawings are exemplary; flow paths can change depending on placement and design of influent/effluent ports, baffles, and conduits defined below. Also, the influent/effluent ports are shown as circular herein for ease of description. However, the influent/effluent ports may be of any size/shape.

Figure 1A:
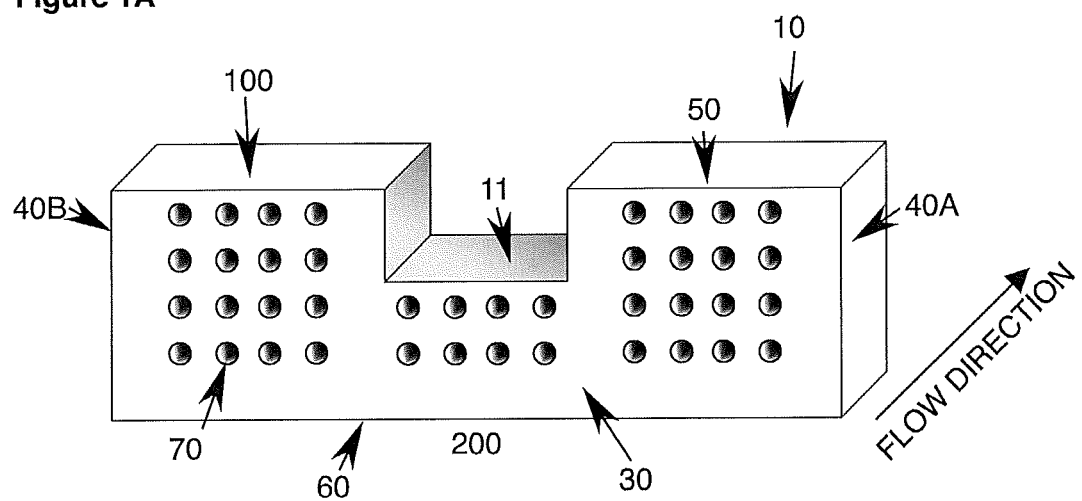
FIG. 1A is a perspective view of an exemplary weir.
Figure 1B:
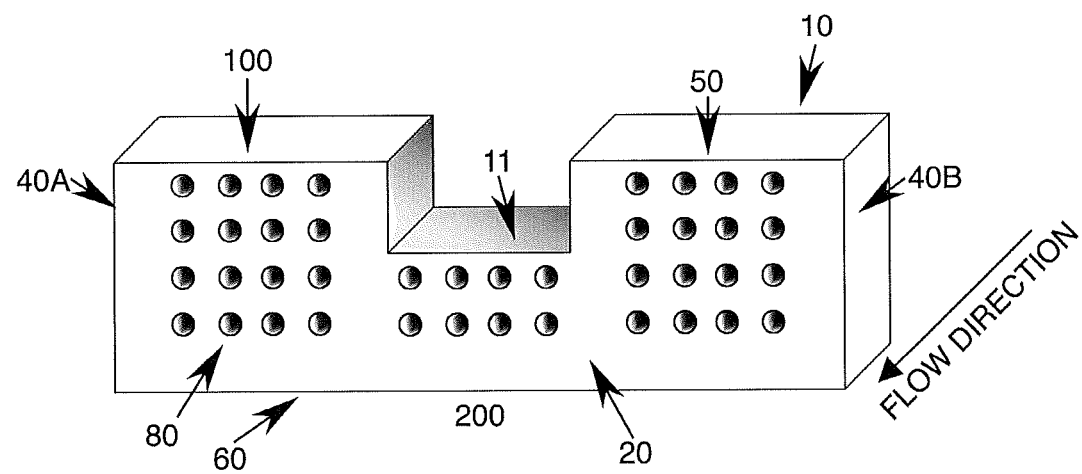
FIG. 1B is a perspective view of an exemplary weir.

Referring to FIGS. 1A-1B, and 4, in an exemplary embodiment, the apparatus (8) includes a weir (10) with an elongated chamber (100) defined by a downstream-wall (20), an upstream-wall (30), a pair of end walls (40A, 40B), a top-wall (50), and a base (60). Preferably, the downstream-wall (20), upstream-wall (30), and end walls (40A, 40B) are upright. The top-wall (50) may be a removable cover plate. The base (60) and/or end walls (40A, 40B) may be anchored to the waterway using any known anchoring method such as steel reinforced concrete footings with post-tensioning embedded within the stream bank, and/or pre-stressed bedrock anchors allowing water to flow under the weir (10) through a natural streambed or engineered streambed (200) (i.e., engineered hyporheic zone).

Fluid will enter the weir (10) through at least one influent port (70) and exit through at least one effluent port (80). Influent (70) and effluent (80) ports may be closable allowing external control of fluid flow through the weir (10). The top-wall (50) may define at least one influent port (70).

Figure 1C:
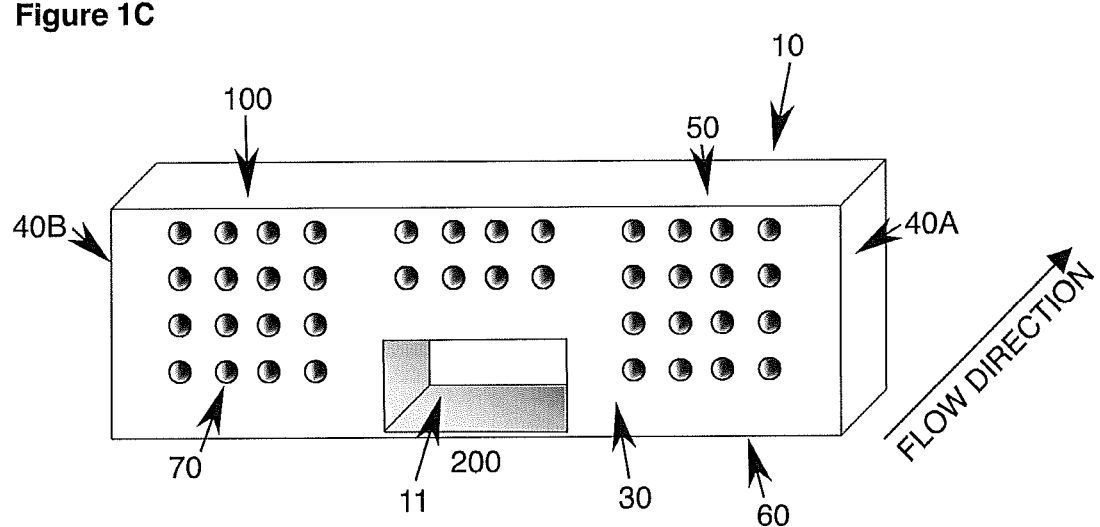
FIG. 1C is a perspective view of an exemplary weir.
Figure 1D:
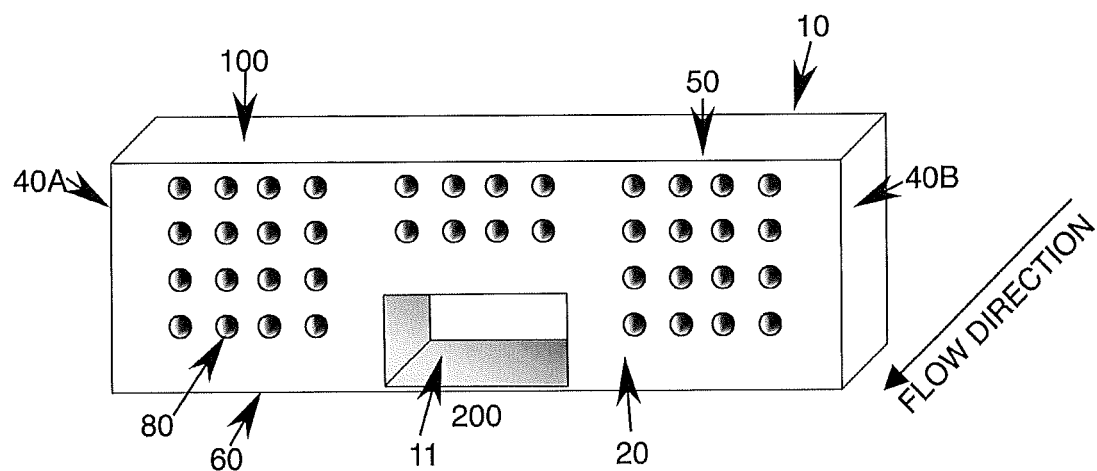
FIG. 1D is a perspective view of an exemplary weir.

The downstream-wall (20) and upstream-wall (30) may define at least one low-flow bypass (11) to allow fish or other aquatic life to bypass the weir (10) during a dry season, for example. Referring to FIGS. 1A and 1B, in one embodiment, the downstream-wall (20), upstream-wall (30), and top-wall (50) may define at least one low-flow bypass (11) where the low-flow bypass (11) is a depression. Referring to FIGS. 1C and 1D, in another embodiment, the weir (10) may be configured such that at least one low-flow bypass (11) is created between the top-wall (50) and the base (60).

Although the low-flow bypass (11) is shown as a rectangular shape in the exemplary drawings, it should be noted that the number, shape, size, and location of the low-flow bypass (11) will depend on local environmental conditions. Preferably, when located on the top of the weir (10) the low-flow bypass (11) is shaped as a rectangle, cipoletti (notch with sloped sides), or v-shaped notch.

Figure 2A:
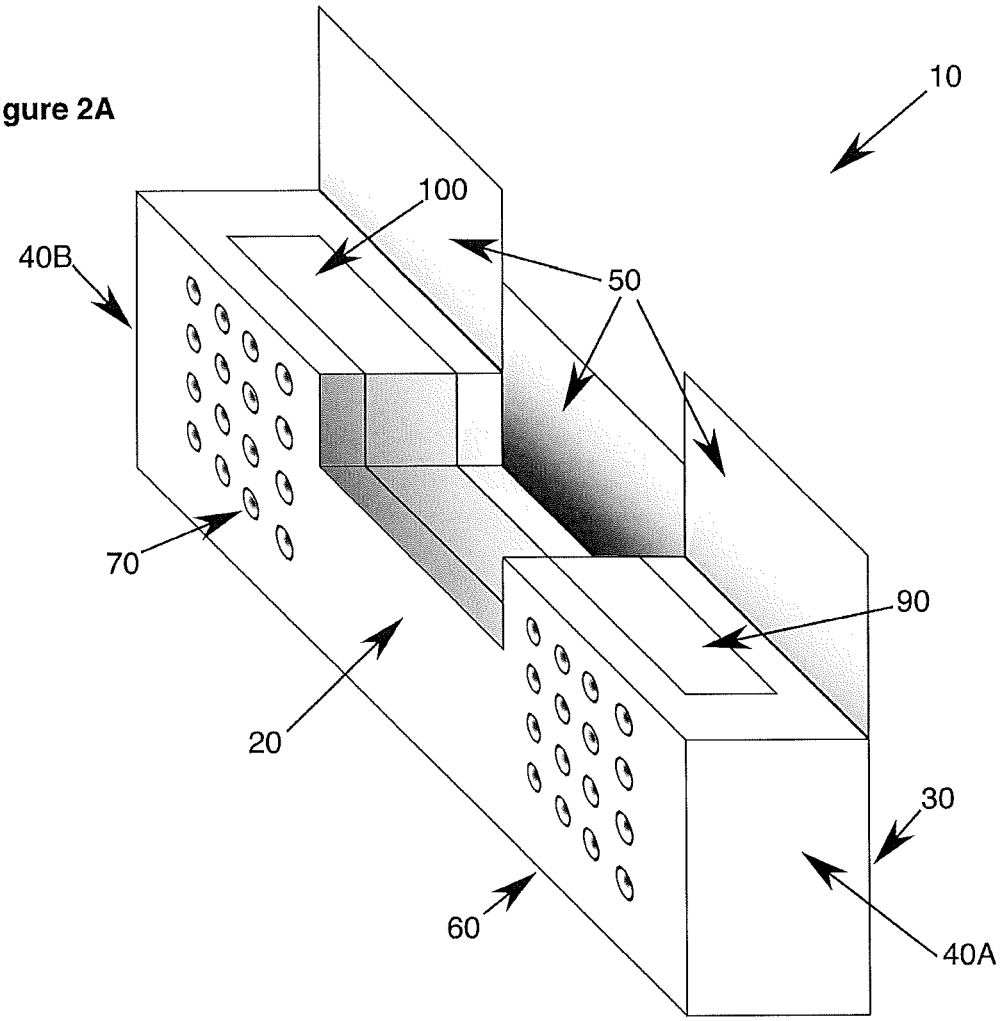
FIG. 2A is a perspective view of an exemplary weir having a replaceable cartridge.
Figure 2B:
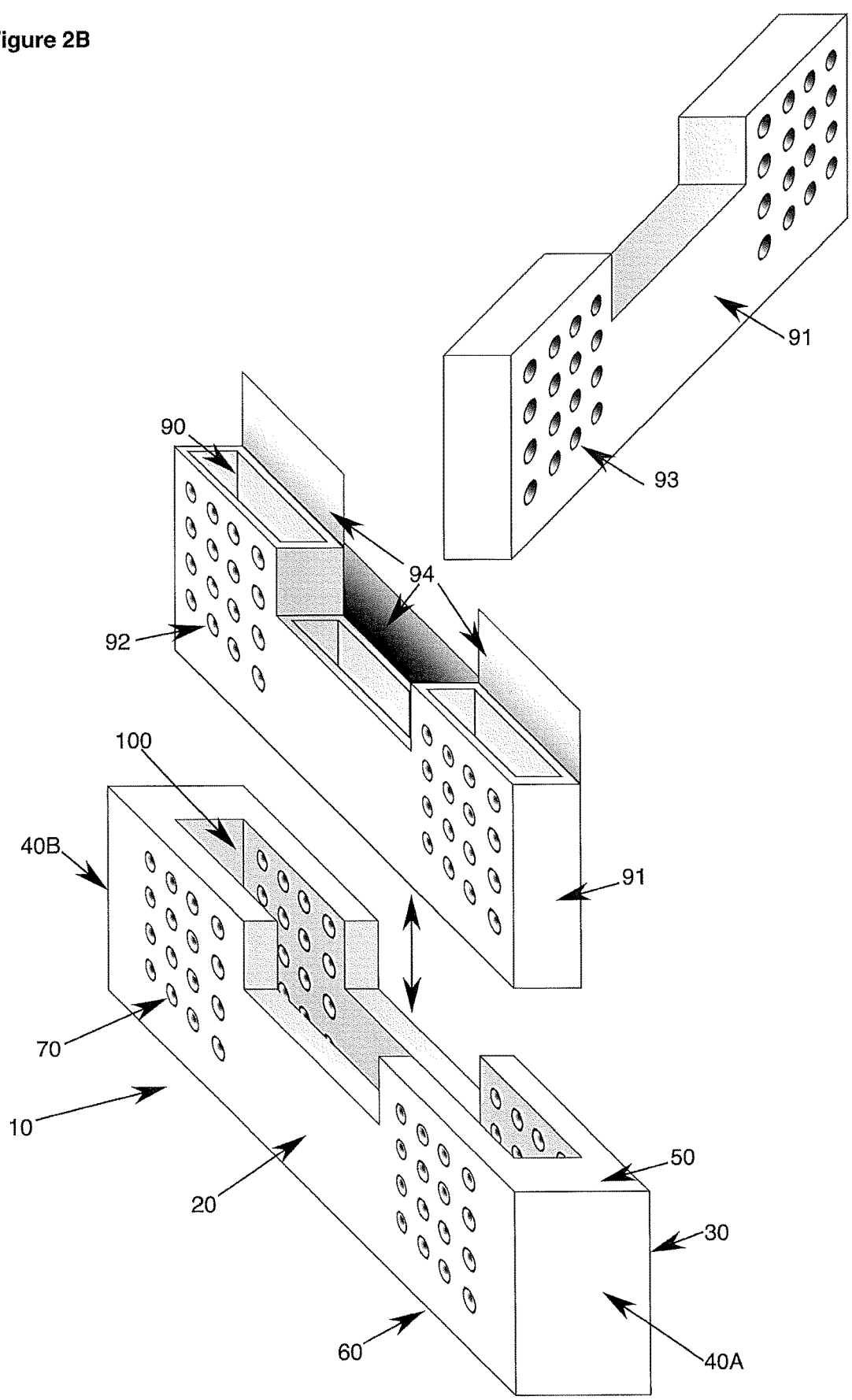
FIG. 2B is a perspective view of an exemplary weir having a replaceable cartridge.

FIGS. 2A-2B show an embodiment of the weir (10) with the chamber (100) large enough to accommodate filter media (90). The filter media (90) may be placed directly into the chamber (100), into a removable media cartridge (91) that is then placed into the chamber (100), or a combination thereof. Fluid flow through the media cartridge (91) may be controlled by at least one influent port (92) and one effluent port (93) formed therein. The chamber (100) may be large enough to accommodate a plurality of media cartridges (91) stacked on top of each other, side-by-side, or in any other conceivable configuration.

If the filter media (90) is placed directly into the chamber (100), the filter media (90) may be removed by a vacuum truck or other vacuuming mechanism, for example, and then replaced. Media cartridges (91) may be replaced by sliding the media cartridge (91) out of the chamber (100); an exemplary embodiment is shown in FIG. 2B. In a preferred embodiment, the media cartridge (91) defines at least one access door (94) allowing easy removal of the filter media (90).

Filter media (90) may comprise any known or unknown components such as semipermeable membranes, activated carbon, biochar, sand, zeolite, crushed rock, crushed glass, volcanic rock, agricultural and forestry waste, calcium carbonate, metal oxides, zero valent iron, pelletized or non-pelletized wastewater treatment residue, amongst others. The type and amount of filter media (90) used at a site will depend on the pollutants to be removed and local environmental conditions.

Figure 3B:
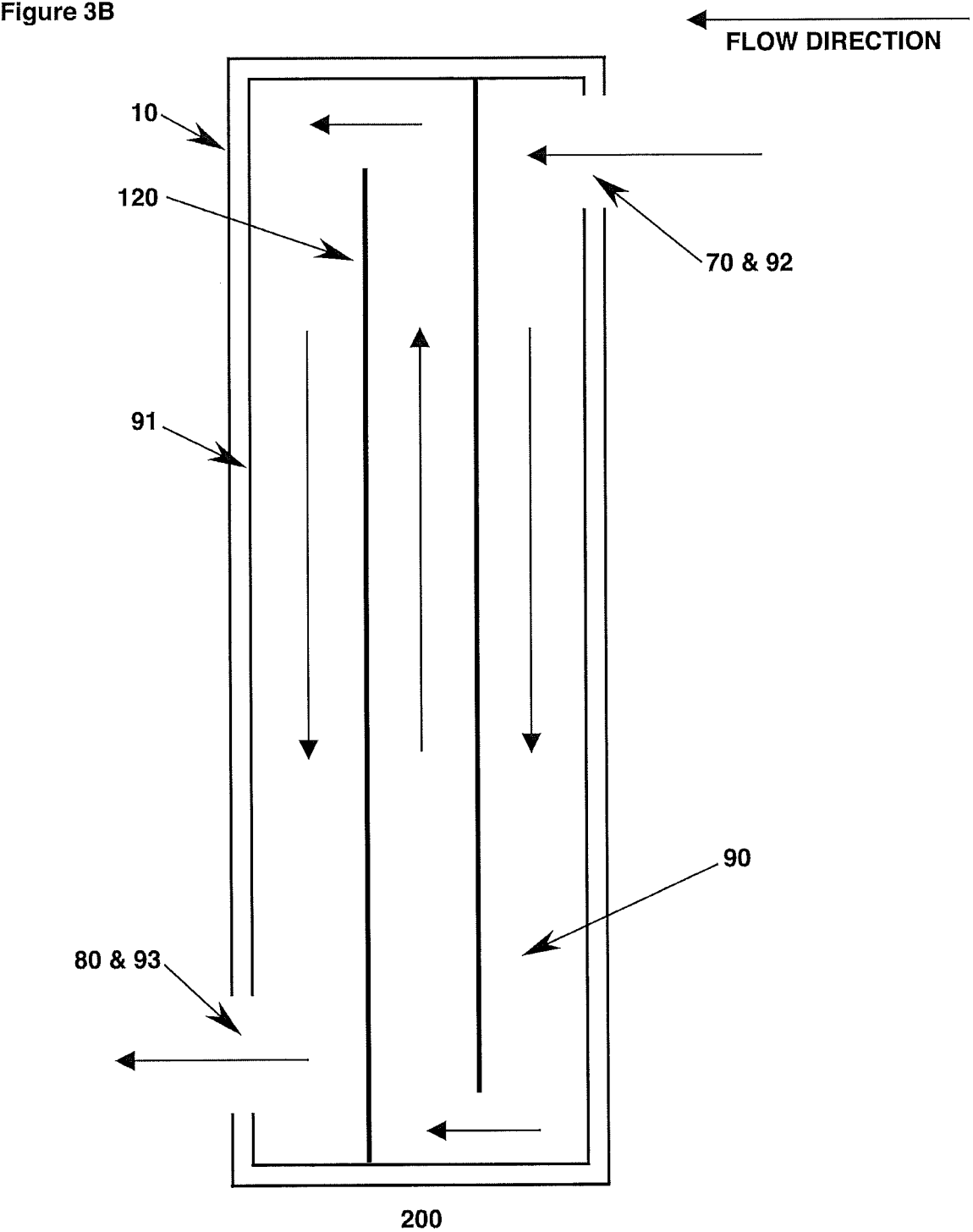
FIG. 3B is a schematic showing fluid flowing through an exemplary weir comprising baffles.

FIGS. 3A-3B show another embodiment of the weir (10) with a valvular conduit (110) or other similar conduit or valve and/or baffles (120) used to control the flow of water inside the chamber 100. A valvular conduit (110) and/or baffles (120) may be configured so that it is held within the chamber (100); or the media cartridge (91) may be shaped as a valvular conduit (110) and/or contain baffles (120); or a combination thereof. The valvular conduit (110) allows a portion of the fluid entering the weir (10) to pass downstream and a portion to return upstream to be treated again. Both the valvular conduit (110) and the baffles (120) increase fluid contact time with filter media (90) increasing the pollutant removal efficiency of the weir (10).

More specifically, FIG. 3A shows an exemplary fluid flow path when flow is controlled by a valvular conduit (110). FIG. 3B shows an exemplary fluid flow path when flow is controlled by baffles (120). Flow rate through the weir (10) will depend upon hydraulic head differences between the upstream and downstream sides of the weir (10), permeability of filter media (90), the number and position of influent (70, 92) and effluent (80, 93) ports on the weir (10) and media cartridge (91), valvular conduits (110), and/or baffles (120).

Referring to FIG. 4, the downstream-wall (20) and upstream-wall (30) may define at least one bypass slit (12) allowing fine particles that settle within the weir (10) to be flushed out. This bypass slit (12) may be of sufficient size to allow fish and other aquatic life to pass through the Weir (10). The weir (10) may be installed above an engineered hyporheic zone (125). The engineered hyporheic zone (125) may comprise filter media having qualities similar to or the same as the filter media used in the weir (10).

The top-wall (50) may be sloped in the downstream direction to prevent clogging of influent ports (70) that may be located at the top of the weir (10). This configuration allows debris to be carried downstream as liquid flows over the top of the weir (10).

A portion of the fluid on the upstream side of the weir (10) may flow under the weir (10) into the engineered hyporheic zone (125). Preferably, fluid flowing through the engineered hyporheic zone (125) will be treated, as described above, and rejoin surface fluid flow downstream of the weir (10). The flow path within the engineered hyporheic zone (125) may be increased by installing one or more sheet piles or other flow diverting structures (130). In some cases, downstream flow over the weir (10) may cause a scour zone. This problem can be alleviated by locating at least one sheet pile or other flow diverting structures (130) at the edge of the scour zone.

Figure 5A:
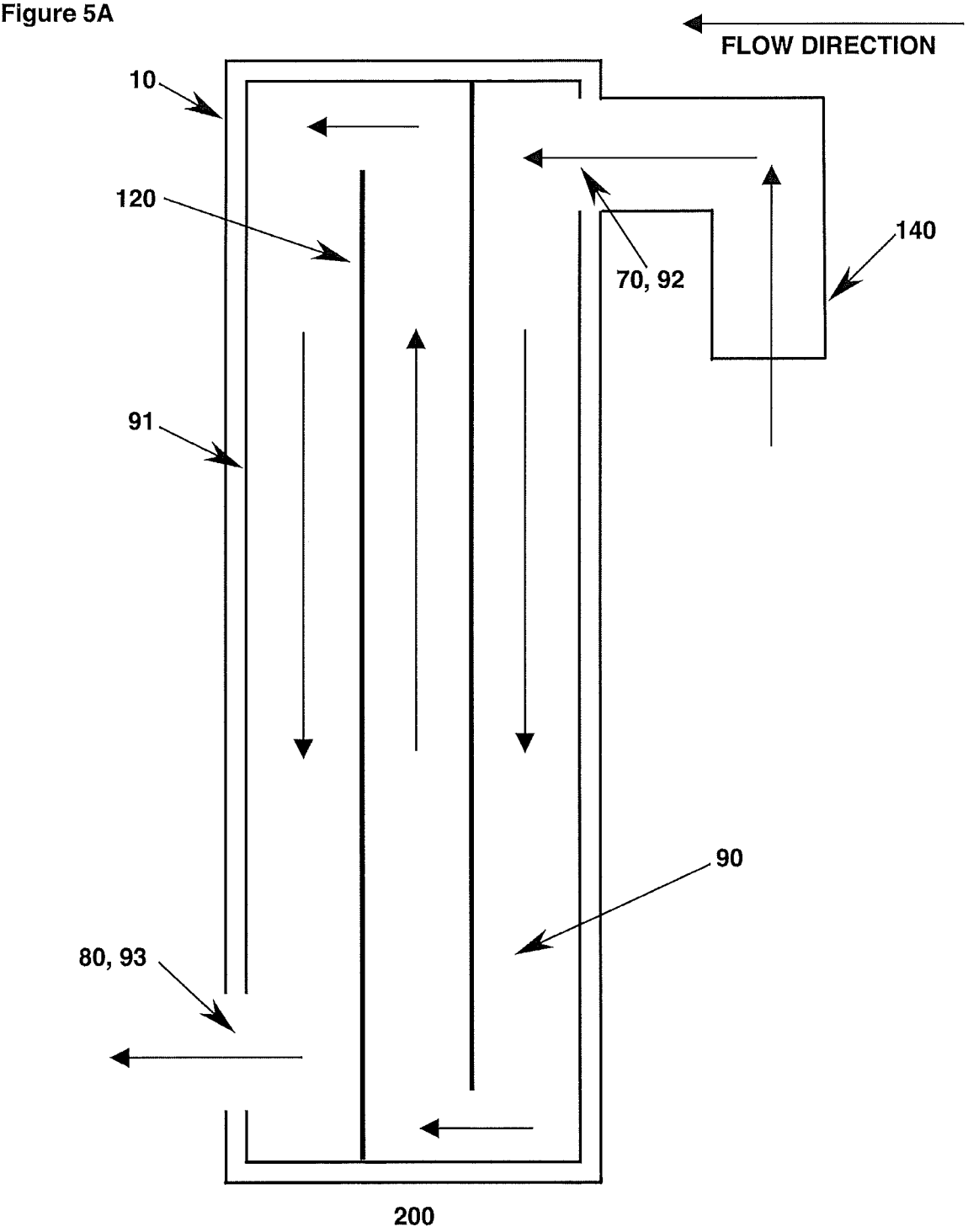
FIG. 5A is a schematic of an exemplary weir showing an influent port with a drawdown orifice.
Figure 5B:
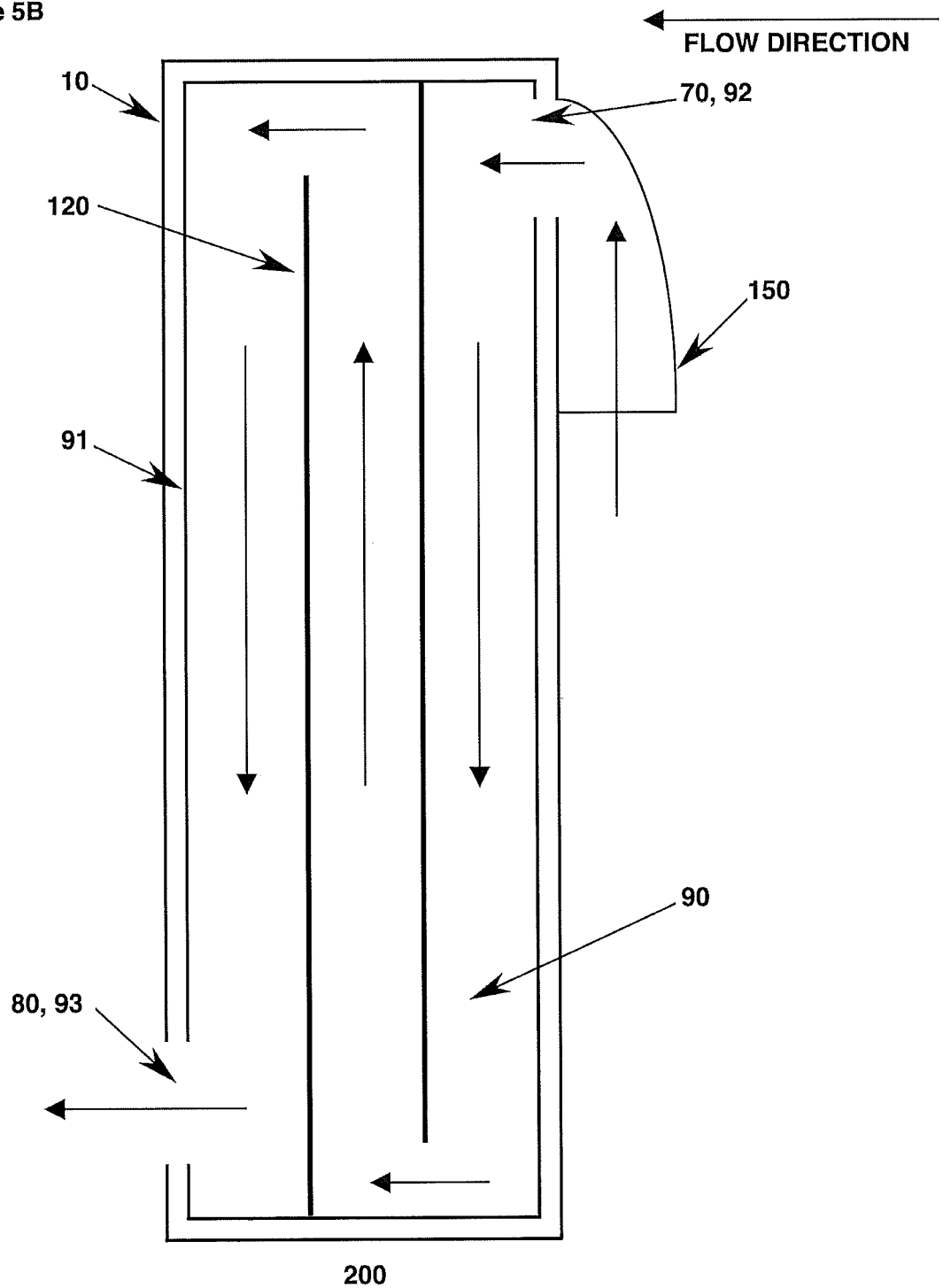
FIG. 5B is a schematic of an exemplary weir showing an influent port with a hood.

Referring to FIGS. 5A-5B, a drawdown orifice (140) or hood (150) may be placed over one or more influent ports (70, 93), respectively, providing a barrier to floating debris to prevent debris from clogging influent ports (70, 93). Preferably, the drawdown orifice (140) is a downturned pipe that allows fluid to flow upwards into the pipe and then redirects the fluid into the upstream side of the weir (10). Preferably, the hood (150) is a curved cover that allows fluid to enter from below the liquid surface while excluding floating debris. A person having ordinary skill in the art will appreciate that other barrier methods, such as screens, may be used.

Figure 6:
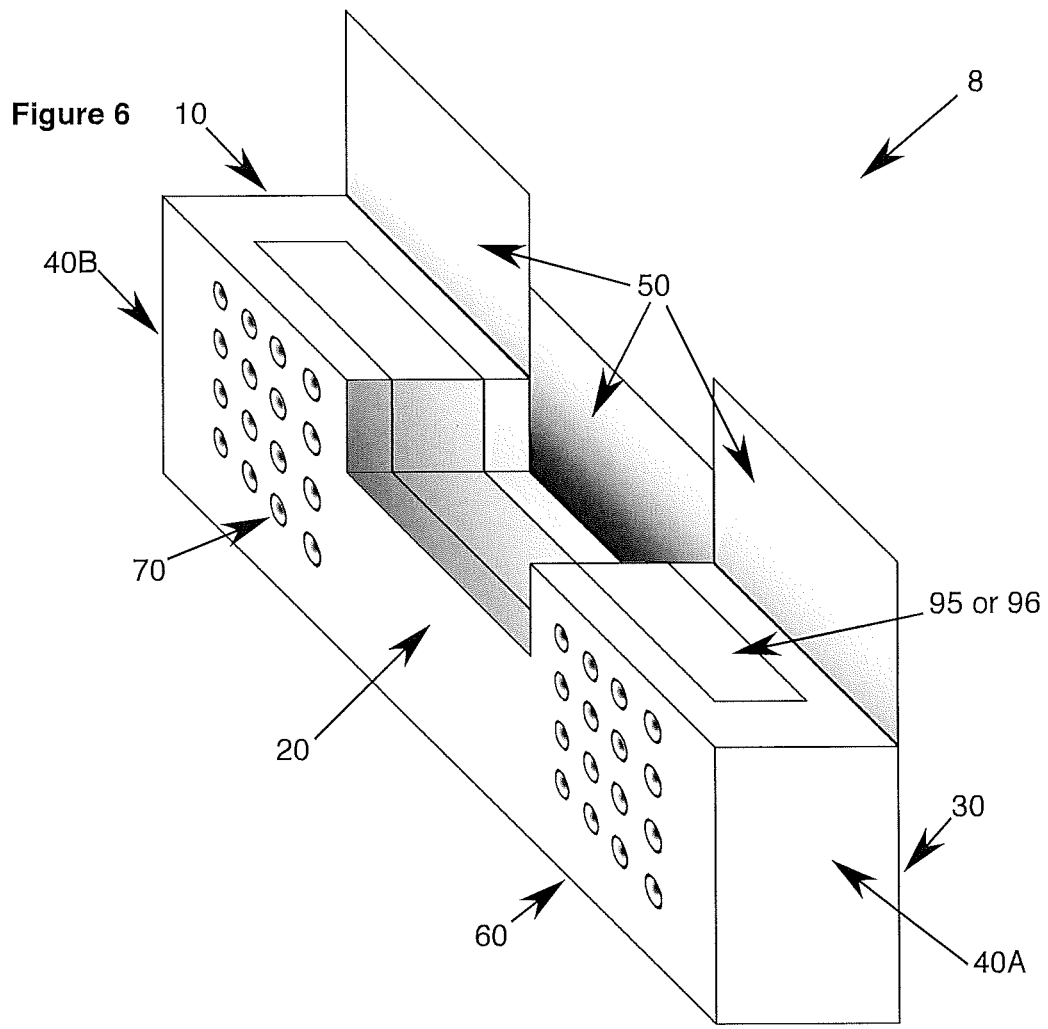
FIG. 6 is a perspective view of an exemplary weir containing water treatment equipment.

In an alternative embodiment shown in FIG. 6, the water treatment apparatus (8) includes a chamber (100) large enough to accommodate one or more pieces of water treatment equipment, generally indicated by reference number (95). The water treatment equipment (95) may include a reverse osmosis filter, an air compressor, an air bubbler, an air pump, an air sparger, an air stripper, an auger, a rotating bio-contactor, a bubble diffuser, a centrifuge, an electro-coagulator, a capacitive and electro deionizer, electrodes, an electrodialysis unit, an evaporator, a solvent extractor, a belt filter, biofilter, a media filter, a pressure filter, a rotating disk filter, a vacuum membrane filter, a dissolved air flotation cell, a heat exchanger, a conductive heater, an electrical resistive heater, a radio frequency heater, a solar thermal heater, a thermoelectric heater, a sludge hopper, a hydrolyzer, a chemical injector, a screw jack, an electro magnet, a membrane, a microwave generator, a catalytic oxidizer, a chemical oxidizer, an electrolytic oxidizer, a supercritical water oxidizer, a wet oxidizer, a regenerative thermal oxidizer, an oxygen generator, an ozone generator, a water pump, a bioreactor, biofilm reactor, electric reactor, a membrane reactor, a microbe-electrode reactor, a refrigerator, an algae scrubber, an electro-kinetic separator, a gravity separator, a parallel an non-parallel plate separator, a steam generator, a natural endogenous respiration vessel, a superoxide generator, ultraviolet (UV) light bulb, an UV disinfector, and an UV oxidizer. The number and type of water treatment equipment (95) used at a site will depend on the pollutants to be removed and local environmental conditions. During assembly, a plurality of water treatment equipment (95) may be stacked on top of each other, placed side-by-side, or arranged in any other conceivable configuration.

Figure 7:
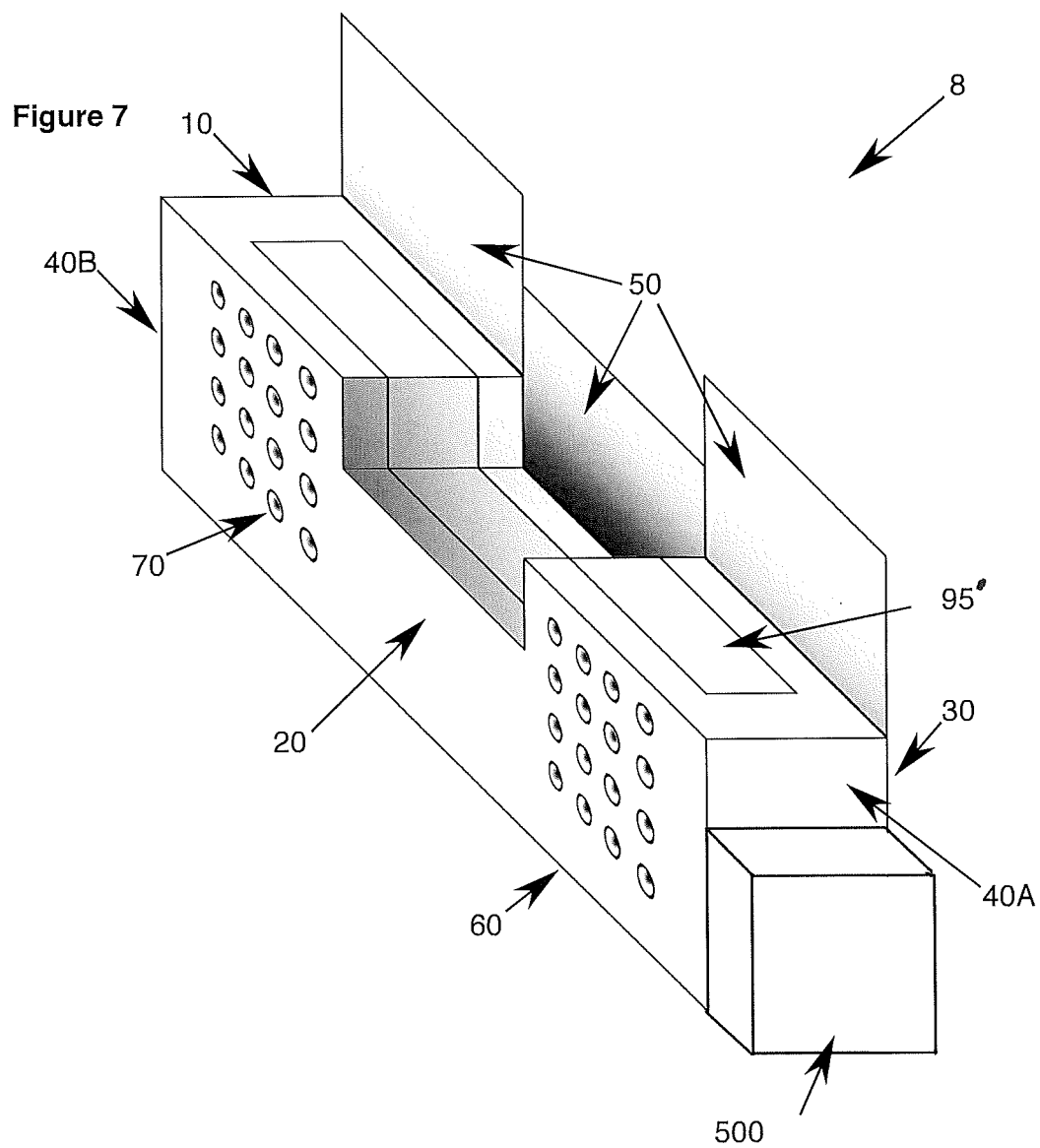
FIG. 7 is a perspective view of an exemplary weir connected to an electrical energy source.

Some of the water treatment equipment listed above requires an energy source. Referring to FIG. 7, the weir (10) includes an electrical energy dependent water treatment equipment (95') connected to electrical energy source, (500), such as a hydroelectric generator.

Figure 8:
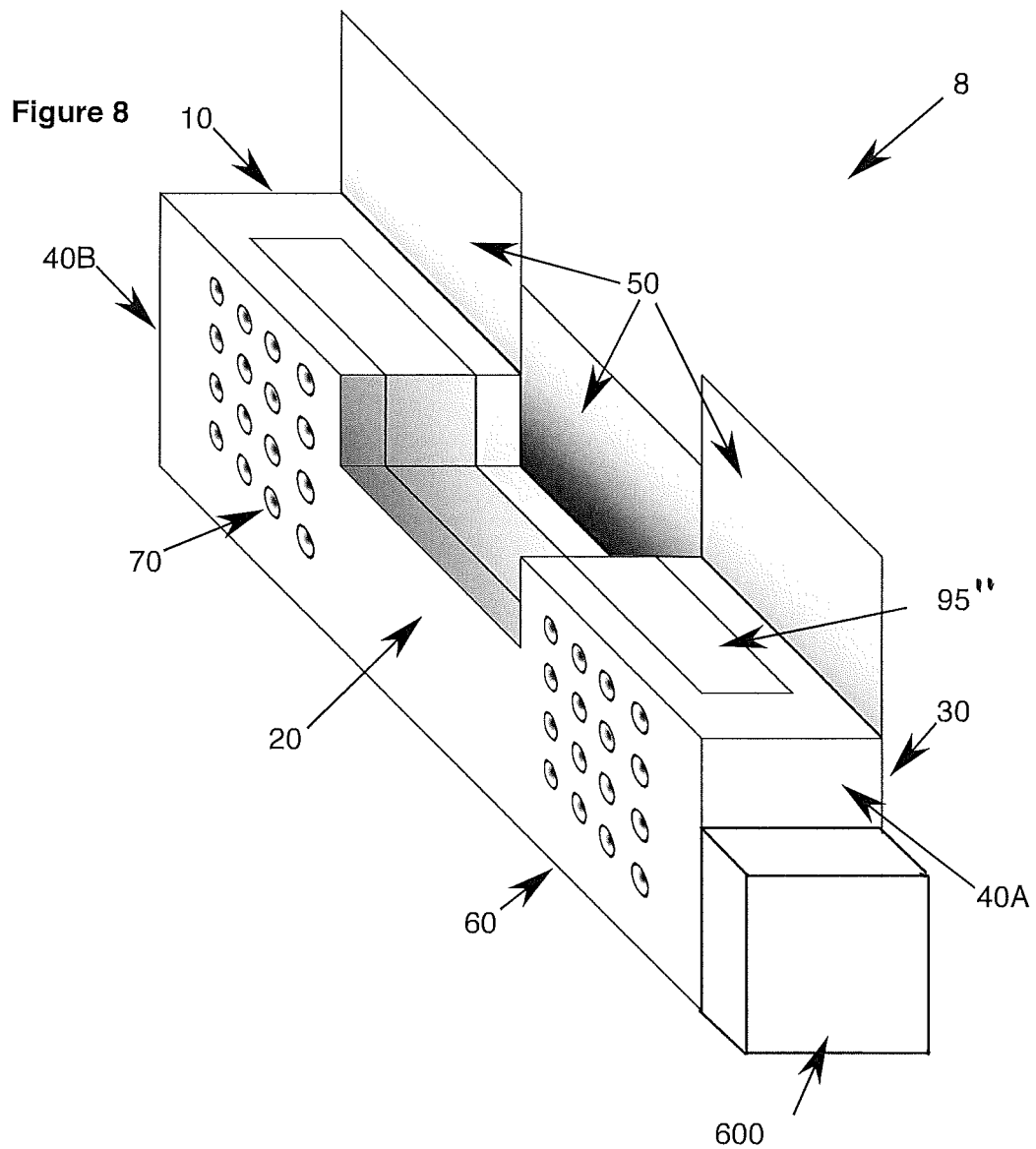
FIG. 8 is a perspective view of an exemplary weir connected to a mechanical energy source.

Referring to FIG. 8, the weir (10) includes mechanical energy dependent water treatment equipment (95") connected to a mechanical energy source (600), such as a horizontal axis waterwheel.

Figure 9:
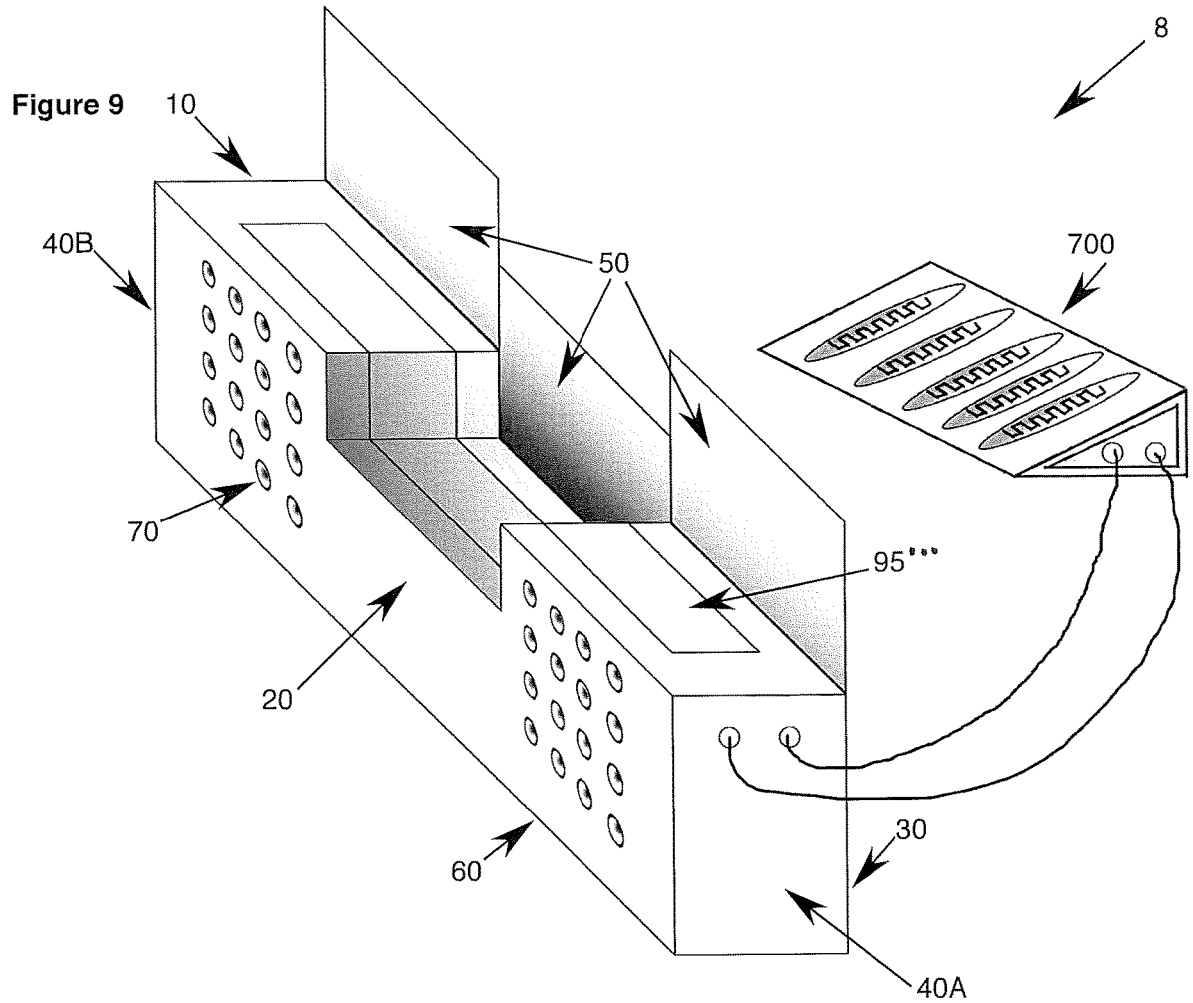
FIG. 9 is a perspective view of an exemplary weir connected to a thermal energy source.

Referring to FIG. 9, the weir (10) includes as thermal energy dependent water treatment equipment (95''') connected to a thermal energy source (700), such as a solar thermal collector.

We claim:

1. A water treatment apparatus for a waterway, comprising:
    a weir that includes an upstream wall, a downstream wall, side walls, a base and a top opening, the upstream wall, the downstream wall and the side walls each include an outside surface and an inside surface;
    a chamber located inside the weir, defined by the inside surfaces of the upstream wall, the downstream wall, the side walls and the base;
    one or more top walls that singularly or collectively cover all or a portion of the top opening;
    at least one influent port hole formed on the upstream wall configured to allow water flowing against the upstream wall to flow through the upstream wall and collect inside the chamber;
    at least one effluent port hole formed on the downstream wall configured to allow water in the chamber to flow through the downstream wall to exit the chamber and flow into the waterway downstream from the weir;
    water treatment equipment located in the chamber; and
    whereas when the weir is placed in, the waterway with the upstream wall facing upstream and the influent port hole is at least partially submerged, water flowing against the outside surface of the upstream wall may flow into the influent port hole and into the chamber and undergo treatment by the water treatment equipment and then flow through the effluent port hole in the downstream wall and exit the weir and return to the waterway downstream of the weir.

2. The water treatment apparatus, as recited in claim 1, wherein the water treatment equipment is connected to an electrical energy source.

3. The water treatment apparatus, as recited in claim 1, wherein the water treatment equipment is connected to a mechanical energy source.

4. The water treatment apparatus, as recited in claim 1, wherein the water treatment equipment is connected to a thermal energy source.

5. The water treatment apparatus, as recited in claim 1, wherein the water treatment equipment includes one or more of the following; an air compressor, an electro-coagulator, an electro deionizer, an electrode, a chemical injector, a microwave generator, an ozone generator, a bioreactor, a heat exchanger, a screw jack, an electro-kinetic separator, and a parallel or non-parallel plate separator.

6. The water treatment apparatus, as recited in claim 5, wherein the water treatment equipment is connected to an electrical energy source.

7. The water treatment apparatus, as recited in claim 5, wherein the water treatment equipment is connected to a mechanical energy source.

8. The water treatment apparatus, as recited in claim 5, wherein the water treatment equipment is connected to a thermal energy source.

* * * * *